(12) United States Patent
Parahyba

(10) Patent No.: US 12,344,470 B1
(45) Date of Patent: Jul. 1, 2025

(54) CONDIMENT PACKAGE STORAGE AND OPENING DEVICE

(71) Applicant: Alvaro Parahyba, Lehigh Acres, FL (US)

(72) Inventor: Alvaro Parahyba, Lehigh Acres, FL (US)

( * ) Notice: Subject to any disclaimer, the term of this patent is extended or adjusted under 35 U.S.C. 154(b) by 436 days.

(21) Appl. No.: 17/842,016

(22) Filed: Jun. 16, 2022

(51) Int. Cl.
*A47K 10/42* (2006.01)
*A47J 47/01* (2006.01)
*B65D 83/08* (2006.01)
*B65G 1/04* (2006.01)
*G07F 17/00* (2006.01)

(52) U.S. Cl.
CPC ............... *B65G 1/04* (2013.01); *A47J 47/01* (2013.01); *G07F 17/0064* (2013.01)

(58) Field of Classification Search
CPC ..... A47J 47/01; B65D 25/04; B65D 83/0454; B65G 1/04; G07F 17/0064
See application file for complete search history.

(56) References Cited

U.S. PATENT DOCUMENTS

| | | | | |
|---|---|---|---|---|
| 689,394 A * | 12/1901 | Gegory | ..................... | B26D 7/18 270/58.08 |
| D148,473 S * | 1/1948 | Krag | ........................... | D6/677.1 |
| 3,733,112 A * | 5/1973 | Marquardt | ................ | A47F 1/08 312/97.1 |
| 5,123,719 A * | 6/1992 | Oden | ........................ | A47F 1/08 312/49 |
| D328,387 S * | 8/1992 | McFarland | .................... | D6/407 |
| 5,330,075 A | 7/1994 | Brown, Sr. | | |
| 6,715,389 B1* | 4/2004 | Hay | ........................ | B26D 3/10 83/176 |
| 10,301,096 B2 | 5/2019 | Stever et al. | | |
| 11,485,553 B2* | 11/2022 | Yoshida | ............... | B65D 50/043 |
| 2006/0159509 A1* | 7/2006 | Grez | ...................... | A61C 17/22 401/123 |

\* cited by examiner

*Primary Examiner* — Gene O Crawford
*Assistant Examiner* — Kevin L Randall, Jr.
(74) *Attorney, Agent, or Firm* — Sanchelima & Associates, P.A.; Jesus Sanchelima; Christian Sanchelima

(57) ABSTRACT

A condiment package storage and opening device including a container assembly and an opening assembly. The container assembly includes a cylindrical container that is formed by a base, a central portion, and a top reservoir. The top reservoir has a cup shape and is volumetrically suitable to receive condiment sachets therein. The opening assembly is disposed on a front side of the central portion and includes a dosing chamber, actuation members and a discharge tube. The dosing chamber receives sachets coming from the top reservoir. When a sachet is inside the dosing chamber a user can press the actuation members that internally move the discharge tube for it to be inserted in the sachet providing an easy method to open the sachets.

2 Claims, 5 Drawing Sheets

CONDIMENT PACKAGE STORAGE AND OPENING DEVICE

1. FIELD OF THE INVENTION

The present invention relates to a condiment package storage and opening device and, more particularly, to a condiment package storage and opening device that facilitates the usage of the condiments contained in sachet bags.

2. DESCRIPTION OF THE RELATED ART

Several designs for condiment storage devices have been designed in the past. None of them, however, include a reservoir that is volumetrically suitable to receive multiple condiment sachets and that has a dosing chamber which receives one of the sachets to easily open it using a discharge tube, thereby a user can manually press two actuation members to pierce the sachet and pour the content thereof.

Applicant believes that a related reference corresponds to U.S. Pat. No. 5,330,075 issued for a condiment dispensing apparatus that is placed inside of a condiment package and has a piercing tip that is used to create a discharge aperture in the packaging. Applicant believes that another related reference corresponds to U.S. Pat. No. 10,301,096 issued for a fluid dispensing valve that has a piercing member that punctures a flexible bag allowing the contents to be discharged. None of these references, however, teach of a storage container and opening device for condiment sachets that is comprised of a cylindrical container with a rotating lid that is disposed on the front of the storage container which will puncture and insert a discharge tube into a condiment sachet providing a method for discharging the contents of the sachet.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an easy way to open sachets.

It is another object of this invention to provide a device that helps individuals to open condiment sachets.

It is still another object of the present invention to provide a condiment package storage and opening device that allows users to enjoy the content in a practical and safe way without any risk of accidents or bacterial contamination.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
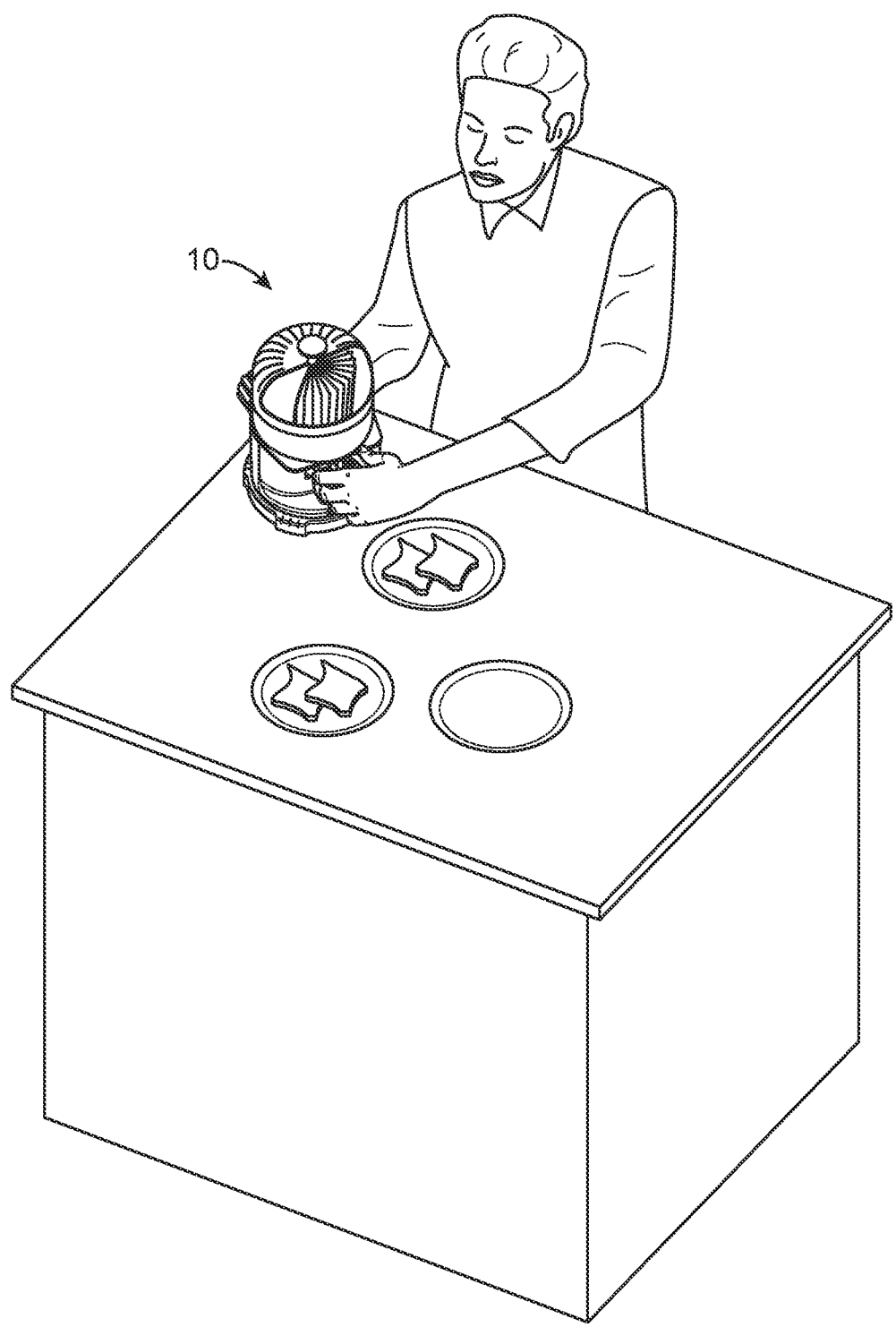
FIG. 1 represents an operational view of a user actuating the present invention 10.
Figure 2:
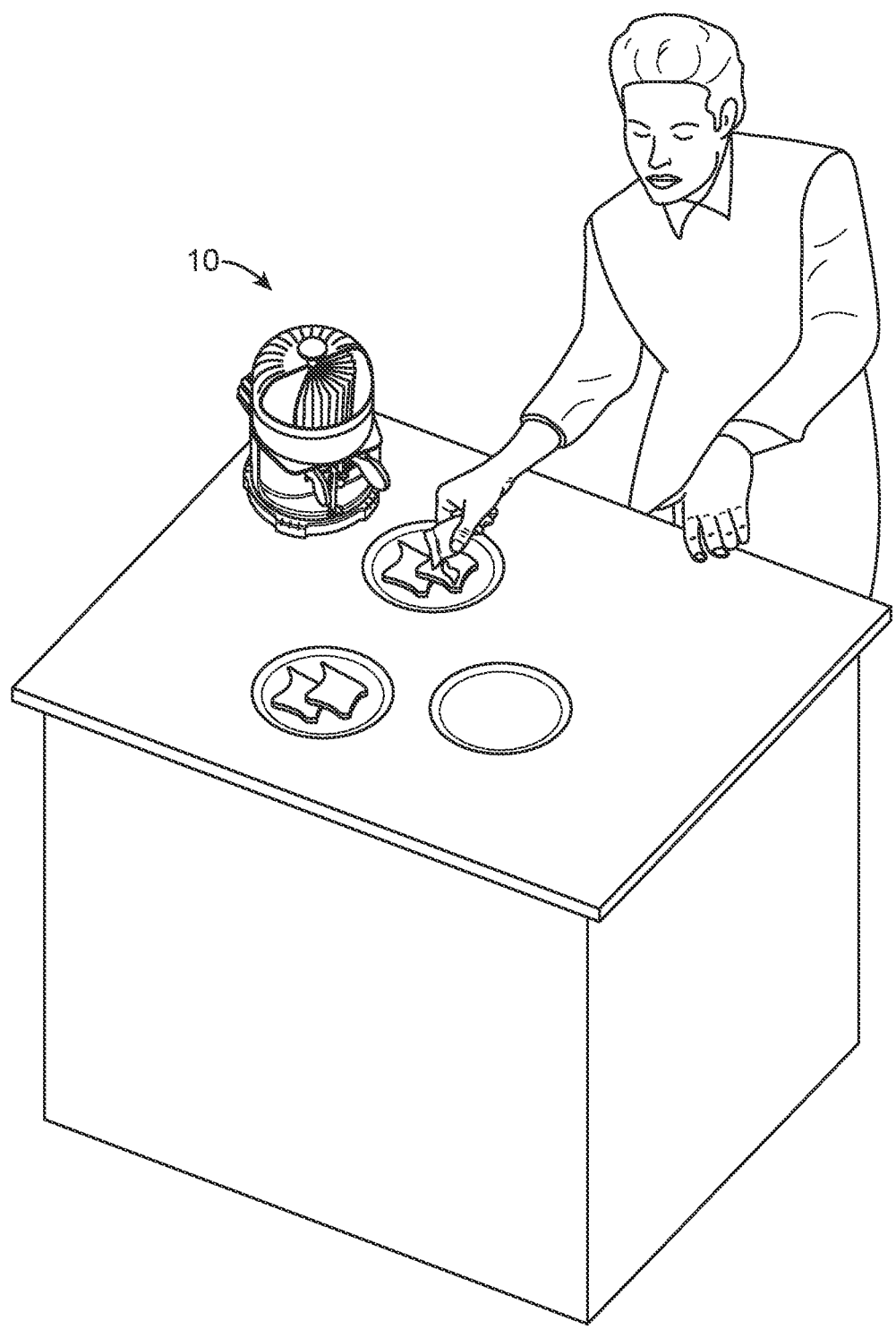
FIG. 2 shows an operational view of a user pouring out the content of a sachet after being opened using the present invention 10.

Referring now to the drawings, where the present invention is generally referred to with numeral 10, it can be observed that it basically includes a container assembly 20, an opening assembly 40, and a rotating assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 3:
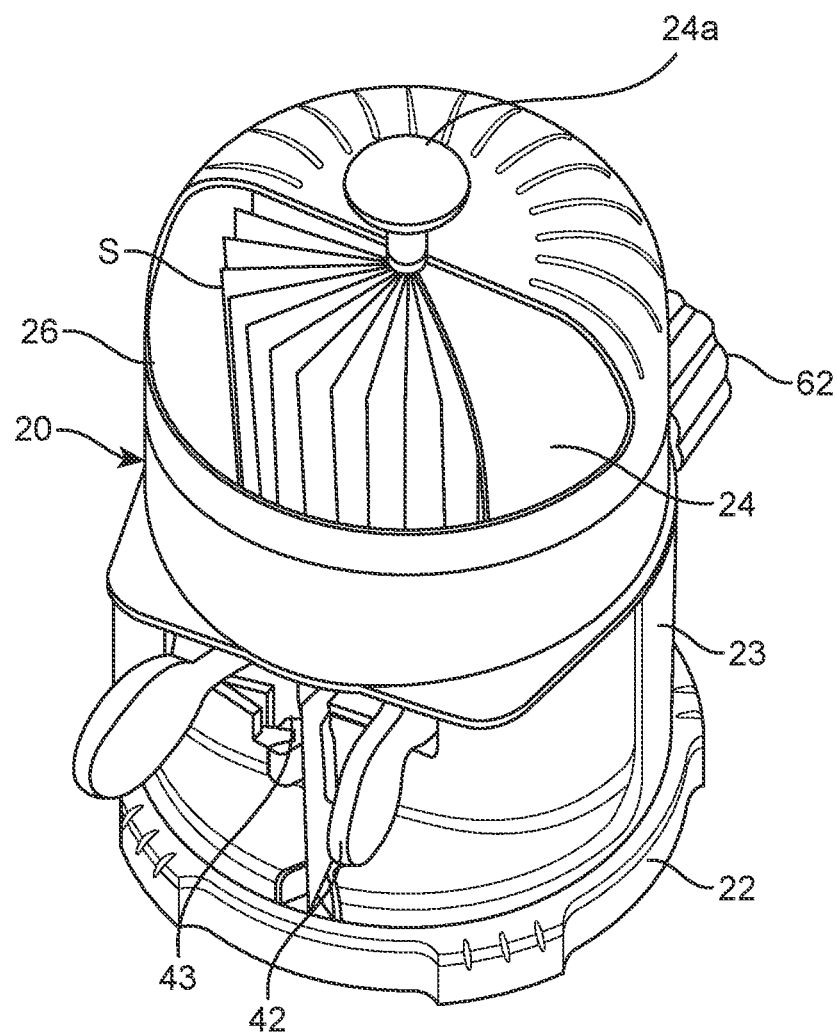
FIG. 3 illustrates an isometric view of the container assembly 20 having a container 22, a rotating lid, and a top reservoir having sachets S therein. It is also shown the dosing chamber and the actuation members from the opening assembly.

As illustrated in FIG. 3, the container assembly 20 includes a base 22, a central portion 23, and a top reservoir 26. The base 22, the central portion 23, and the top reservoir 26 may define a container. The container may be made of a sturdy, resistant, and durable material. The container assembly 20 may be made of polyacetal, which is a material that exhibits rigidity, high strength, solvent resistance, fatigue resistance, toughness, self-lubricity, cold-flow resistance. In other embodiments, the container may be made of ceramics, polymers, metal, metal alloys, fibers, synthetic materials, natural materials, or any variation or combination thereof. In a suitable embodiment, the container may be cylindrical. The base 22 may have a substantially circular shape with four members that outwardly protrude from the periphery of the base. The central portion 23 is located on top of the base 22. The central portion 23 may have a substantially cylindrical shape. In other embodiments, the central portion 23 may have other prism shapes, be it a regular prism shape or an irregular prism shape. The central portion 23 may have a diameter smaller that the diameter of the base. The central portion 23 may house the opening assembly 40. The central portion 23 may have a front side which is substantially flat. The top reservoir 26 is located on a distal end of the central portion 23, opposite to the base 22 On top of the central portion 23 there may be a top reservoir 26. The top reservoir 26 may be hollow and may be volumetrically suitable to receive condiments sachets S therein. To access the top reservoir 26 the container assembly includes a rotating lid 24 which may be manually actuated to cover the top reservoir 26. A user may be able to move the rotating lid 24 by means of a rotating handle 24a to introduce sachets S inside the reservoir. The top reservoir 26 may be cup-shaped. The rotating handle 24a may be located on top of the top reservoir 26.

Figure 4:
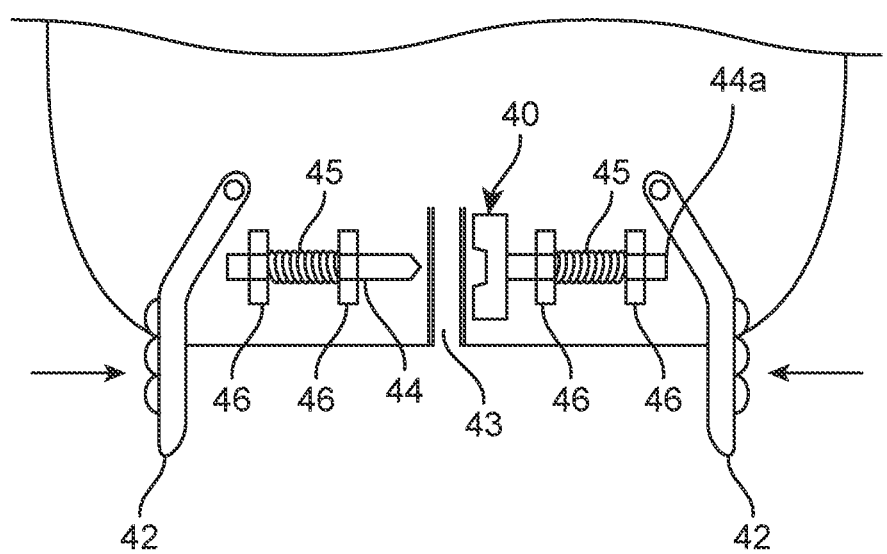
FIG. 4 is a representation of a partially broken top cross sectional view of the opening assembly 40.

As illustrated in FIG. 4, the opening assembly 40 includes actuation members 42, a dosing chamber 43, a discharge tube 45, a spring 45, and guides 46. As depicted in FIG. 3 the opening assembly is disposed on the front of the central portion 23 of the container assembly 20. The opening assembly 40 may permit a user to open the condiment sachets S in an easy and hygienic way. The dosing chamber 43 may be internally connected with the top reservoir 26 so that condiment sachets S may travel therefrom to the dosing chamber 43. The dosing chamber may be formed by two parallel sides. The discharge tube 44 may be internally disposed within the central portion and may be located proximal to the dosing chamber 43. The discharge tube 45 may be supported by the guides 46 which permit the discharge tube to follow a linear trajectory. The discharge tube 44 may be disposed orthogonally with respect to the dosing chamber 43. The discharge tube 44 may be made of stainless steel. In other embodiments, the discharge tube may be made of any other suitable material. To actuate the discharge tube 44 a user may press the actuation members 42 which may internally contact the discharge tube 44 and a supporting tube 44a. Pressing the actuation members 42 may cause the discharge tube 44 and the supporting tube 44a to me moved towards the dosing chamber 43. When the dosing chamber has a condiment sachet S therein, the discharge tube 44, when actuated, may pierce the condiment sachet S. Each the discharge tube 44 and the supporting tube 44a may be covered with springs 45 that permit the actuation members 42 to return to an unpressed/rest position when released.

Figure 5:
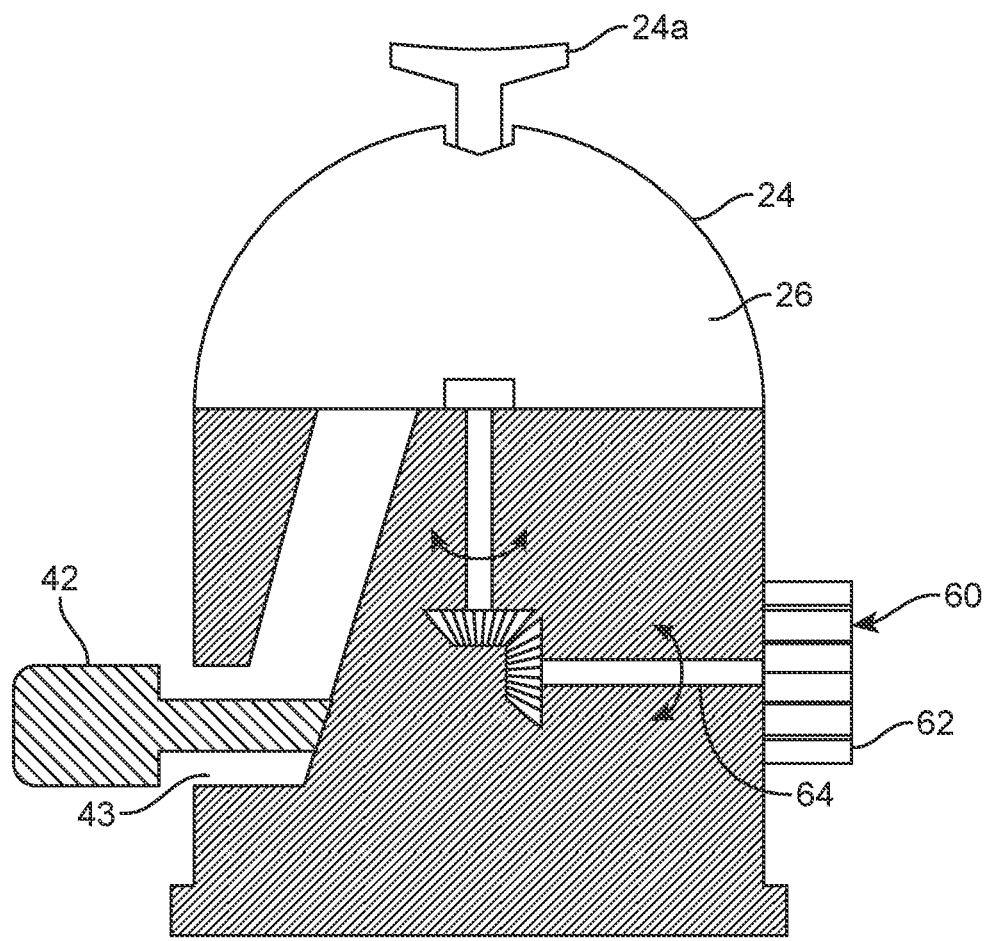
FIG. 5 depicts a lateral cross section view showing the knob connected to the transmission to manually rotate the top reservoir.

Best illustrated in FIG. 5, the rotating assembly includes a knob 62 connected to a transmission system 64. The knob 62 may be disposed on a rear side of the central portion 23 opposite to the dosing chamber 42. In other embodiments, the knob 62 may be placed wheresoever on the surface of the central portion 23. The knob 62 may have an ergonomic shape that permits a user to easily grab it and turn it. In one embodiment, the knob may have a circular shape, in other embodiments the knob may have other suitable polygonal shapes. The knob 62 may be internally connected with the transmission system 64, which in turn, may be internally connected to the top reservoir 26. By rotating the knob 62 the transmission system 64 may rotate the top reservoir 26. The dosing chamber 43 may be refilled when the knob 62 may be rotated, as this causes the top reservoir 26 to rotate and may let the condiment sachets to be delivered into the dosing chamber 43.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. The condiment package storage and opening device, comprising:
    a container assembly including a base, a central portion, and a top reservoir which define a cylindrical container, wherein said container is made of polyacetal, said top reservoir includes a rotating lid that allows access to an interior of the top reservoir, the top reservoir is volumetrically suitable to store condiment sachets therein, the top reservoir is cup-shaped;
    an opening assembly disposed on a front side of the central portion, the opening assembly includes a dosing chamber, actuation members, a discharge tube, and springs, said dosing chamber is defined by two parallel sides, the discharge tube is disposed orthogonally with respect to said dosing chamber, said actuation members are configured to be pressed by a user, when pressed the actuation members moves the discharge tube towards said dosing chamber, the dosing chamber receives a condiment sachet from the condiment sachets therein to be perforated by the discharge tube when the actuation members are pressed, the springs permit the discharge tube and the actuation members to return to a rest position, the discharge tube is connected to guides that support the discharge tube and permit the discharge tube to follow a linear trajectory; and
    a rotating assembly including a transmission system and a knob, said knob is located on a rear side of the central portion opposite to the opening assembly, the knob has a circular shape and is internally connected to the transmission system at one end, the transmission system is internally disposed within said central portion, the transmission system is internally connected to the top reservoir at an opposite end, the top reservoir is rotated by means of the knob and the transmission system, by rotating the top reservoir the condiment sachets are supplied into the dosing chamber.

2. The condiment package storage and opening device, consisting of:
    a container assembly including a base, a central portion, and a top reservoir which define a cylindrical container, wherein said container is made of polyacetal, said top reservoir includes a rotating lid that allows access to an interior of the top reservoir, the top reservoir is volumetrically suitable to store condiment sachets therein, the top reservoir is cup-shaped;
    an opening assembly disposed on a front side of the central portion, the opening assembly includes a dosing chamber, actuation members, a discharge tube, a supporting tube, and springs, said dosing chamber is defined by two lateral sides which are parallel, the discharge tube is disposed orthogonally with respect to said dosing chamber at one lateral side, the supporting tube is disposed orthogonally with respect to said dosing chamber at a second lateral side, said actuation members are configured to be pressed by a user, when pressed the actuation members moves the discharge tube and the supporting tube towards said dosing chamber, the dosing chamber receives a condiment sachet from the condiment sachets therein to be perforated by the discharge tube when the actuation members are pressed, the springs permit the discharge tube, the supporting tube and the actuation members to return to a rest position, the discharge tube is connected to guides that support the discharge tube and permit the discharge tube to follow a linear trajectory; and
    a rotating assembly including a transmission system and a knob, said knob is located on a rear side of the central portion opposite to the opening assembly, the knob has a circular shape and is internally connected to the transmission system at one end, the transmission system is internally disposed within said central portion, the transmission system is internally connected to the top reservoir at an opposite end, the top reservoir is rotated by means of the knob and the transmission system, by rotating the top reservoir the condiment sachets are supplied into the dosing chamber.

\* \* \* \* \*